United States Patent Office 3,483,203
Patented Dec. 9, 1969

3,483,203
2-ARALKYL-1,3-DIAZA-2-CYCLOALKENES
Lincoln Harvey Werner, Summit, N.J., assignor to Ciba Corporation, New York, N.Y., a corporation of Delaware
No Drawing. Continuation-in-part of application Ser. No. 313,154, Oct. 2, 1963. This application Mar. 22, 1966, Ser. No. 536,275
Int. Cl. C07d 51/34, 49/34; A61k 27/00
U.S. Cl. 260—251         7 Claims

ABSTRACT OF THE DISCLOSURE 2-(diaryl-propyl)-1,3-diaza-2-cycloalkenes of the formula

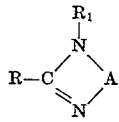

R=1,3- or 2,3-diaryl-propyl; A=alkylene separating the N by 2-4 C; $R_1$=H or alkyl; and salts thereof exhibit antifibrillatory effects.

---

This application is a continuation-in-part of a copending application Ser. No. 313,154, filed on Oct. 2, 1963, and now abandoned.

This invention concerns and has for its object the provision of new 2-(diaryl-propyl)-1,3-diaza-2-cycloalkenes of the formula I

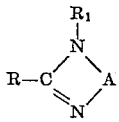

in which R is a member of the group consisting of 1,1-diaryl-n-propyl, 1,2-diaryl-n-propyl, 1,3-diaryl-n-propyl, 2,2-diaryl-n-propyl, 2,3-diaryl-n-propyl, 1,1-diaryl-i-propyl, 1,2-diaryl-i-propyl and 1,3-diaryl-i-propyl, in which aryl represents a monocyclic carbocyclic or a monocyclic heterocyclic aryl radical, the group A is a lower alkylene separating the two ring-nitrogen atoms by two to four carbon atoms, and $R_1$ is hydrogen or lower alkyl, and salts thereof, as well as methods for their preparation.

The monocyclic aryl radicals present in R are primarily carbocyclic aryl radicals, i.e. phenyl, but also include heterocyclic radicals, e.g. 2-, 3- or 4-pyridyl, 2- or 3-furyl, 2- or 3-thienyl. The above aryl radicals may be unsubstituted or substituted by one or more than one of the same or of different substituents present in any of the positions available for substitution. Such substituents are, for example, lower alkyl, e.g. methyl, ethyl, n- or i-propyl, n-, i-, sec. or tert.-butyl, lower alkoxy, e.g. methoxy, ethoxy, n- or i-propoxy, halogeno, e.g. fluoro, chloro or bromo, halogeno-lower alkyl, e.g. trifluoromethyl or pentafluoroethyl. A preferred member of the group R is 2,3-diaryl-n-propyl in which the radicals are above all phenyl, but also includes (lower alkyl)-phenyl, (lower alkoxy)-phenyl, (halogeno)-phenyl and (trifluoromethyl)-phenyl.

The lower alkylene group A represents above all 1,2-ethylene, but also includes 1,2- or 1,3-propylene, 2-methyl-1,3-propylene, 2,2-dimethyl-1,3-propylene, 1,4-, 2,3- or 1,3-butylene, 1,3- or 1,4-pentylene.

The lower alkyl group $R_1$ is, for example, methyl, ethyl, n- or i-propyl, n-sec or tert.-butyl.

Salts of this invention are acid addition salts, preferably derived from pharmaceutically acceptable, non-toxic acids such as inorganic acids, e.g. hydrochloric, hydrobromic, sulfuric, phosphoric acids and the like, or with organic acids, such as carboxylic acids, e.g. formic, acetic, propionic, glycolic malonic, succinic, maleic, hydroxy-maleic, fumaric, malic, tartaric, citric, benzoic, cinnamic, salicylic, 4-amino-salicylic, 2-phenoxybenzoic, 2-acetoxybenzoic acid and the like, or sulfonic acids, e.g. methane sulfonic, ethane sulfonic, 2-hydroxy-ethane sulfonic, ethane 1,2-disulfonic, benzene sulfonic, p-toluene sulfonic, naphthalene 2-sulfonic acid and the like. Other acid addition salts may be used as intermediates, for example, in the purification of the free compounds or in the preparation of other, for example, pharmaceutically acceptable acid addition salts, as well as for identification and characterization purposes. Acid addition salts, which are primarily used for the latter are, for example, those with acidic organic nitro compounds, e.g. picric, picrolonic, flavianic acid and the like, or with metal complex acids, e.g. phosphotungstic, phosphomolybdic, chloroplatinic, Reinecke acid and the like.

The compounds of this invention show useful pharmacological properties. Apart from central nervous system depressing and diuretic effects, they show primarily antifibrillatory effects as can be demonstrated in animal tests, using, for example, mice, rats or the perfused hearts of cats, as test objects. The compounds of the invention are, therefore, useful as tranquilizers, diuretics and particularly as antifibrillatory agents, e.g. in the treatment of neurogenic or cardiogenic, auricular or ventricular fibrillation. The antifibrillatory properties are of prolonged duration.

Outstanding pharmacological properties are exhibited by the compounds having the Formula II

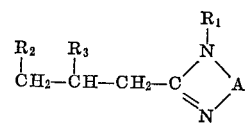

in which $R_1$ is hydrogen or lower alkyl, each of the radicals $R_2$ and $R_3$ is a member selected from the group consisting of phenyl, (lower alkyl)-phenyl, (lower alkoxy)-phenyl, (halogeno)-phenyl or (trifluoromethyl)-phenyl, and A is alkylene having from two to three carbon atoms and separating the two nitrogen atoms by two to three carbon atoms, and pharmaceutically acceptable acid addition salts thereof.

Especially mentioned is 2-(2,3-diphenyl-propyl)-2-imidazoline and its hydrochloride, which, when given to cats at oral doses between about 1 to 35 mg./kg., preferably 1.5 to 3.0 mg./kg., 3 hours before the animals are sacrificed, show outstanding antiarrhythmic effects against fibrillations caused by the perfusion of the isolated heart with a 0.9% saline solution containing 0.022γ/ml. aconitine nitrate.

The compounds of the invention are prepared according to known methods. For example, by converting the modified carboxyl group in a reactive functional derivative of a corresponding aryl-butyric acid, into a 2-(1,3-diaza-2-cycloalkenyl) radical and, if desired, replacing in a resulting compound a hydrogen atom attached to one of the aza-nitrogen atoms of the 2-(1,3-diaza-2-cycloalkenyl) radical by lower alkyl, and/or converting a free compound into a salt thereof or a resulting salt into the free compound or another salt.

The reactive functional derivative of the diaryl-butyric acid is primarily the nitrile thereof, as well as an imidoester, imido-thioester, imido-halide, amidine, amide, thioamide, ester, or acid halide thereof. These starting materials are represented by the formulae

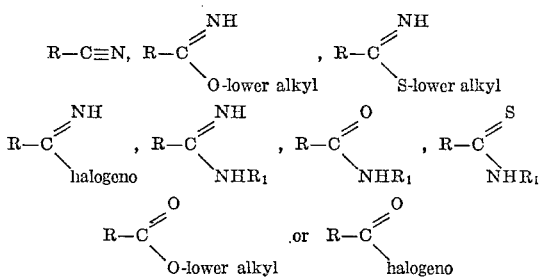

in which halogeno stands primarily for chloro, as well as bromo, and R and $R_1$ have the above-given meaning.

The conversion of said starting materials to the compounds of this invention is carried out, for example, by reacting the starting material with a lower alkylene diamine, in which the two amino groups are separated by two to four carbon atoms, or with a compound capable of being converted into such lower alkylene diamine by treatment with ammonia, or with a reactive N-substituted derivative of such lower alkylene diamine. The desired ring formation is carried out directly or in stages, if necessary, in the presence of a suitable reagent. Furthermore, the process may be performed in such manner that a functional acid derivative is formed in the course of the reaction.

For example, whenever a di-monocyclic aryl-butyronitrile is used as the starting material and is reacted directly with the lower alkylene diamine or with a derivative thereof, it is of advantage to perform the reaction in the presence of hydrogen sulfide, carbon disulfide and the like; in such reaction, the lower alkylene diamine may be used in the form of a salt thereof.

Compounds capable of being converted into a lower alkylene diamine by the reaction with ammonia, are, for example, the corresponding hydroxy-lower alkyl-amines, or especially the esters thereof, as well as lower alkylene halides. Using these starting materials, the reaction is carried out in the presence of ammonia or an agent yielding ammonia.

Reactive N-substituted derivatives of the lower alkylene diamines used as reagents in the above process are ureas, such as, for example, ethylene urea, propylene urea and the like.

To carry out the procedure in stages, the starting material is reacted with the lower alkylene diamine to form the N-acyl compound, which is then ring-closed by elimination of water, for example by using a dehydrating agent, such as calcium oxide and the like, or by desulfurization, for example, with a heavy metal oxide and the like.

The above reaction is carried out according to known methods; conditions depend largely on the choice of the starting material and the reagent. Thus, the reaction may be carried out in the absence or presence of a diluent, catalyst and/or condensing agent, if necessary, while cooling or at an elevated temperature, under increased pressure, and/or in the atmosphere of an inert gas, such as nitrogen. By-products, formed during the reaction, such as water, may be removed, for example, by azeotropic distillation. Furthermore, one of the reactants may be used in excess of the other.

The starting materials used in the above procedure are prepared according to known methods. For example, a di-monocyclic aryl-butyric acid may be converted into its acid halide, e.g. chloride and the like, by treatment with a thionyl halide, e.g. thionyl chloride and the like, which may then be converted into an amide with ammonia or an N-lower alkyl amine. An N-unsubstituted di-monocyclic aryl-butyric acid amide may be dehydrated into the di-monocyclic aryl-butyronitrile by treatment with a suitable dehydrating reagent, e.g. phosphorus oxychloride, thionyl chloride, phosphorus pentoxide and the like; if desired, the resulting di-monocyclic aryl-butyronitriles may be converted into any of the other reactive functionally converted di-monocyclic aryl-butyric acid starting materials.

In a resulting compound, in which one of the nitrogen atoms of 2-(1,3-diaza-2-cycloalkenyl) radical carries a hydrogen, such hydrogen may be replaced by lower alkyl according to known methods. For example, a resulting 2-(di-monocyclic arylpropyl)-1,3-diaza - 2 - cycloalkene, in which the 1,3-diaza-2-cycloalkene portion has from five to seven ring members and one of its ring-nitrogen atoms has a hydrogen, or a salt thereof, such as an alkali metal salt thereof, may be reacted with a reactive ester of a lower alkanol, for example, a lower alkyl halide, e.g. methyl, ethyl or isopropyl, chloride, bromide or iodide and the like or a di-lower alkyl sulfate, e.g. dimethyl sulfate, diethyl sulfate and the like, to yield the corresponding 2-(di-monocyclic arylpropyl)-1,3-diaza - 2 - cycloalkene compound, in which one of the ring nitrogen atoms of the 2-(1,3-diaza-2-cycloalkenyl) radical is substituted by lower alkyl.

A resulting salt may be converted into the free compound, for example, by treatment with an alkaline reagent, such as a metal hydroxide, e.g. sodium hydroxide, potassium hydroxide, calcium hydroxide and the like, a metal carbonate, e.g. sodium, potassium or calcium carbonate or hydrogen carbonate and the like, ammonia or any other alkaline reagent, as well as suitable hydroxyl ion exchange preparation, etc.

A resulting salt may be converted directly into another salt; for example, a salt, especially an inorganic acid addition salt, may be reacted with a suitable metal, e.g. sodium, barium, silver and the like, salt of an acid, in a diluent, in which a resulting inorganic salt is insoluble and is thus removed from the reaction. Conversion of one acid addition salt into another may also be achieved by treatment with an anion exchange preparation.

A free compound may be converted into an acid addition salt by reacting it or a solution thereof in a suitable solvent or solvent mixture with an acid, such as one of those described before, or a solution thereof, or with a suitable anion exchange preparation, and isolating the desired salt. A salt may be obtained in the form of a hydrate or may contain solvent of crystallization.

The invention also comprises any modification of the process wherein a compound formed as an intermediate at any stage of the process, is used as starting material and the remaining step(s) of the process is(are) carried out, or the process is discontinued at any stage, or in which the starting materials are formed in the course of the reaction. Also included within the scope of the present invention are any new intermediates, such as, for example, those mentioned hereinbefore.

In the process of this invention such starting materials are preferably used which lead to final products mentioned in the beginning as preferred embodiments of the invention.

The compounds of this invention are useful in the form of pharmaceutical compositions for enteral, e.g. oral, or parenteral use which consist essentially of a pharmacologically effective amount of one of the compounds of this invention in admixture with a pharmaceutically acceptable, organic or inorganic, solid or liquid carrier. For making up the compositions, there are employed substances which do not react with the new compounds, such as water, gelatin, lactose, starches, stearic acid, magnesium stearate, calcium stearate, talc vegetable oils, benzyl alcohol, stearyl alcohol, gums, accacia, tragacanth, propylene glycol, polyalkylene glycols, or any other carrier materials suitable for making up such compositions. The latter may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. They may also contain, in combination, other useful substances.

The following examples are intended to illustrate the invention. Temperatures are given in degrees centigrade and all parts wherever given are parts by weight.

EXAMPLE 1

A mixture of 4.5 g. of 3,4-diphenyl-butyronitrile, 1.8 g. of ethylene diamine and three drops of carbon disulfide is heated to 125–135° for four hours. After standing overnight, the crystalline mass is triturated with ethanol; the solvent is evaporated to dryness and the residue is dissolved in 30 ml. of ethyl acetate. The solution is filtered, the filtrate is diluted with an additional 25 ml. of ethyl acetate and is then reacted with a solution of anhydrous hydrogen chloride in ethyl acetate. The hydrochloride salt of 2-(2,3-diphenyl-propyl)-2-imidazoline precipitates and is filtered from the solution. The precipitate is dissolved in water, the solution is made alkaline with 2 N aqueous sodium hydroxide and the organic material is extracted with diethyl ether. The organic phase is evaporated and the residue is distilled to yield the 2-(2,3-diphenyl-propyl)-2-imidazoline of the formula

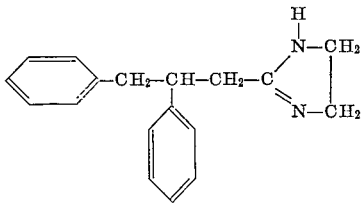

which is collected at 200°/0.05 mm.; it crystallizes and melts at 80–83°; yield: 2.2 g. The 2-(2,3-diphenyl-propyl)-2-imidazoline picrate is prepared by reacting 2-(2,3-diphenyl-propyl)-2-imidazoline with picric acid in the presence of a suitable solvent.

The starting material used in the above procedure is prepared as follows: A mixture of 12.0 g. of 3,4-diphenyl-butyric acid with 12 ml. of thionyl chloride is refluxed for 1½ hours and is then concentrated under reduced pressure. The residue is dissolved in 50 ml. of toluene, and the solvent is evaporated under reduced pressure. This procedure is repeated twice to remove any excess of thionyl chloride, and the residue, containing the 3,4-diphenyl-butyric acid chloride, is then disolved in 50 ml. of benzene and treated with gaseous ammonia. The precipitate is filtered off, and the benzene solution is washed with water and concentrated to yield 6.7 g. of 3,4-diphenyl-butyric acid amide, M.P. 68–70°.

A mixture of 6.5 g. of 3,4-diphenyl-butyric acid amide and 2.2 g. of phosphorus oxychloride is heated on the steam bath for 2 hours. After adding ice and neutralizing the mixture with 20% aqueous sodium hydroxide, the crude 3,4-diphenyl-butyronitrile form is extracted with ethyl acetate, the extract dried and evaporated. The residue is distilled and the fraction boiling at 140°/0.1 mm. collected; yield 4.8 g.

EXAMPLE 2

A mixture of 7.0 g. of 3,4-diphenyl-butyronitrile, 2.8 g. of anhydrous 1,3-propylene diamine and three drops of carbon disulfide, when reacted according to the procedure described in Example 1, yields the 2 - (2,3-diphenyl-propyl)-1,4,5,6-tetrahydro-pyrimidine hydrochloride.

EXAMPLE 3

A mixture of 7.0 g. of 3,4-diphenyl-butyronitrile, 2.8 g. of anhydrous 1,2-propylene diamine and three drops of carbon disulfide, when heated in an oil bath to 135–140° for 6½ hours, and worked up as described in Example 1, yields the 2-(2,3-diphenyl-propyl)-4-methyl-2-imidazoline hydrochloride.

The following compounds are prepared according to the previously described procedure:

| Reactive Functionally Converted Di-Monocyclic Aryl-Butyric Acid | Lower Alkylene Diamine | Product |
|---|---|---|
| 4-(4-methyl-phenyl)-2-phenyl-butyronitrile | Ethylene-diamine | 2-[3-(4-methyl-phenyl)-1-phenyl-propyl]-2-imidazoline. |
| 4-(4-chloro-phenyl)-3-phenyl-butyronitrile | do | 2-[3-(4-chloro-phenyl)-2-phenyl-propyl]-2-imidazoline. |
| 3,4-di-(4-chloro-phenyl)-butyronitrile | do | 2-[2,3-di-(4-chloro-phenyl)-propyl]-2-imidazoline. |
| 3-(3,4-dimethoxy-phenyl)-4-phenyl-butyronitrile | do | 2-[2-(3,4-dimethoxy-phenyl)-3-phenyl-propyl]-2-imidazoline. |
| 3-phenyl-4-(2-pyridyl)-butyronitrile | do | 2-[2-phenyl-3-(2-pyridyl)-propyl]-2-imidazoline. |
| 4-(4-fluoro-phenyl)-3-phenyl-butyronitrile | do | 2-[3-(4-fluoro-phenyl)-2-phenyl-propyl]-2-imidazoline. |
| 4-(4-isopropyl-phenyl)-3-phenyl-butyronitrile | do | 2-[3-(4-isopropyl-phenyl)-2-phenyl-propyl]-2-imidazoline. |
| 3,4-diphenyl-butyronitrile | 1,4-butylene diamine | 2-(2,3-diphenyl-propyl)-1,3-diaza-2-cycloheptene. |
| 4-phenyl-3-(4-trifluoromethyl-phenyl)-butyronitrile | Ethylene-diamine | 2-[3-phenyl-2-(4-trifluoromethylphenyl)-propyl]-2-imidazoline. |

EXAMPLE 4

To a solution of 2.0 g. of 2-(2,3-diphenyl-propyl)-2-imidazoline in 10 ml. of ethanol is added 2 ml. of methyl iodide. The reaction mixture is allowed to stand at room temperature for four hours and is then concentrated to dryness under reduced pressure to yield the desired 2-(2,3-diphenyl-propyl)-1-methyl-2-imidazoline hydriodide.

EXAMPLE 5

Pharmaceutical compositions consisting essentially of a pharmacologically effective amount of a compound of this invention as the active ingredient together with a pharmaceutically acceptable carrier, are prepared according to standard pharmaceutical methods. Usually, the carrier represents the major portion of such pharmaceutical preparation, which consists essentially of from about 1 percent to at most 50 percent of the active ingredient.

Single dosage unit compositions for oral use have from about 0.01 g. to about 0.1 g. of one of the above 2-(di-monocyclic aryl)-1,3-diaza-2-cycloalkene compounds or a pharmaceutically acceptable acid addition salt thereof as the pharmacologically active ingredient together with a pharmaceutically acceptable solid carrier.

Tablets, each containing 0.025 g. of 2-(2,3-diphenyl-propyl)-2-imidazoline hydrochloride as the pharmacologically effective ingredient, are prepared as follows (for 25,000 tablets):

| Ingredients: | G. |
|---|---|
| 2-(2,3-diphenyl-propyl)-2-imidazoline hydrochloride | 625.00 |
| Lactose S.D. | 5,967.25 |
| Corn starch | 192.50 |
| Corn starch (for paste) | 143.00 |
| Confectioners sugar | 500.00 |
| Stearic acid | 72.25 |
| Purified water, q.s. | |
| Alcohol anhydrous 3A, q.s. | |

The 2-(2,3-diphenyl-propyl)-2-imidazoline hydrochloride is mixed with an equal portion of lactose; the mixture is passed through a No. 16 screen on a Fitzpatrick mill at medium speed and placed into a mixer. The remainder of the lactose, the 192.5 g. of corn starch, the confectioners sugar and the stearic acid are added, and the powder is mixed for twenty minutes. 143.0 g. of corn starch is suspended in cold water and a paste is formed by diluting the mixture with 700 ml. of boiling water. The paste is then added to the dry powder mixture to form the granulate; granulation is completed by adding 50 ml. of a 1:1-mixture of the 3A alcohol and water. The wet mass is passed through a No. 5 screen on the Fitzpatrick mill at low speed, dried on trays at about 43° and then broken on a No. 12 screen. The granulate is compressed into tablets weighing 0.3 g., using ¹¹⁄₃₂ inch dies and standard concave punches.

What is claimed is:

1. A member selected from the group consisting of the compound of the formula

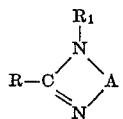

in which R represents a member selected from the group consisting of 1,3-di-X-n-propyl, 2,3-di-X-n-propyl and 1,3-di-X-i-propyl, in which X represents a member selected from the group consisting of phenyl, 2-pyridyl, 3-pyridyl and 4-pyridyl and one of these radicals substituted by a member selected from the group consisting of lower alkyl, lower alkoxy, halogeno and halogeno-lower alkyl, the group A represents lower alkylene separating the two nitrogen atoms by two to four carbon atoms and $R_1$ represents a member selected from the group consisting of hydrogen and lower alkyl, and a pharmaceutically acceptable acid addition salt thereof.

2. A compound as claimed in claim 1 having the formula

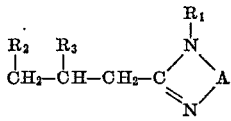

in which $R_1$ is a member selected from the group consisting of hydrogen and lower alkyl, each of the groups $R_2$ and $R_3$ is a member selected from the group consisting of phenyl, (lower alkyl)-phenyl, (lower alkoxy)-phenyl, (halogeno)-phenyl and (trifluoromethyl)-phenyl, and A is alkylene having from two to three carbon atoms separating the two nitrogen atoms by two to three carbon atoms, and a pharmaceutically acceptable acid addition salt thereof.

3. A compound as claimed in claim 2 wherein each of the groups $R_2$ and $R_3$ is phenyl.

4. A compound as claimed in claim 2 selected from the group consisting of 2-(2,3-diphenyl-propyl)-2-imidazoline and the hydrochloride thereof.

5. A compound according to claim 2 selected from the group consisting of 2-(2,3-diphenyl-propyl)-1,4,5,6-tetrahydropyrimidine and the hydrochloride thereof.

6. A compound according to claim 2 selected from the group consisting of 2-(2,3-diphenyl-propyl)-4-methyl-2-imidazoline and a hydrochloride thereof.

7. A compound according to claim 3 selected from the group consisting of 2-(2,3-diphenyl-propyl)-1-methyl-2-imidazoline and the hydroiodide thereof.

References Cited

UNITED STATES PATENTS

| 3,024,236 | 3/1962 | Hughes | 260—256.4 |
| 3,340,271 | 9/1967 | Werner | 260—309.6 |

FOREIGN PATENTS

| 283,583 | 1952 | Switzerland. |

ALEX MAZEL, Primary Examiner
R. V. RUSH, Assistant Examiner

U.S. Cl. X.R.

260—239, 256.4, 296, 309.6; 424—244, 251, 263, 273